UNITED STATES PATENT OFFICE

GEORGE P. TANGEMAN, OF HAMILTON, OHIO.

IMPROVEMENT IN COMPOUNDS FOR TREATING CARPET-LINING PAPER.

Specification forming part of Letters Patent No. 176,706, dated April 25, 1876; application filed March 9, 1876.

To all whom it may concern:

Be it known that I, GEO. P. TANGEMAN, of Hamilton, Butler county, Ohio, have invented a new and useful Compound for Protecting Carpets from Injury by Vermin, which compound is fully described in the following specification.

This invention relates to that class of compositions used for repelling moths from textile fabrics; and consists in a compound formed by mixing cedar, tobacco, hops, tansy, and salso-acid or sal-soda, with paper-pulp used for making carpet-linings.

These ingredients may be used in their natural or crude condition, or they may be used as prepared in their commercial state, which admits of their combination in a fluid condition.

The twigs or shavings of the cedar-tree, tobacco-stems, tansy, and hops in their natural state, and sal-soda or salso-acid, in the commercial state, may be wrought into the paper-pulp like any kind of paper-stock; or the essential principles or extracts of the cedar, tobacco, tansy, and hops, and a solution of the sal-soda or salso-acid, may be mixed together, making a composition which is pungent and acrid; and the thick porous carpet-paper may be treated with this liquid composition by the use of a brush-roll attached to the paper-machine as the paper is discharged therefrom in the manufactory.

All of the ingredients of the compound to be wrought into the pulp may be subjected to the action of steam in a closed vessel in the usual way of preparing "hard stock," and then beaten in the engine with the stock of which such paper is commonly made.

I prefer to use the ingredients of my new compound in the following proportions: For each hundred-weight of paper, five pounds of cedar, three pounds of tobacco-stems, two pounds of hops, one-half pound of tansy, and one pound of salso-acid; but the proportions may be varied in some degree without destroying the desired pungent and acrid qualities to be imparted to the paper. And when the paper is to be treated with the fluid compound as above specified, substantially the same proportions of the essential extracts and solutions of the ingredients will be used. It should be remarked that hemlock may be substituted for the cedar, and that the salso-acid may be used in a greatly diminished quantity without destroying the desired quality of the compound.

The composition may be applied to the paper with a small mixture of mucilage.

What I claim as my invention, and desire to secure by Letters Patent, is—

The compound for preparing or treating carpet-lining paper, consisting of cedar, tobacco, tansy, hops, and salso-acid, in proportions substantially as described, for the purpose specified.

Witness my hand this 9th day of February, A. D. 1876.

GEO. P. TANGEMAN.

Witnesses:
   JNO. P. P. PECK,
   H. P. K. PECK.